United States Patent
Striuli

(10) Patent No.: US 9,930,410 B2
(45) Date of Patent: Mar. 27, 2018

(54) VIDEO RECEIVING APPARATUS FOR PROCESSING A VIDEO CONTENT RECEIVABLE FROM A PLURALITY OF DISTRIBUTION PLATFORMS, AND METHOD THEREOF

(71) Applicant: SISVEL TECHNOLOGY S.R.L., None (IT)

(72) Inventor: Alessandro Striuli, Mestre (IT)

(73) Assignee: Sisvel Technology S.R.L., None (TO) (IT)

( * ) Notice: Subject to any disclaimer, the term of this patent is extended or adjusted under 35 U.S.C. 154(b) by 0 days.

(21) Appl. No.: 14/287,449

(22) Filed: May 27, 2014

(65) Prior Publication Data

US 2014/0359673 A1  Dec. 4, 2014

(30) Foreign Application Priority Data

May 29, 2013 (IT) .............................. TO2013A0437

(51) Int. Cl.
 *H04N 21/462* (2011.01)
 *H04N 21/24* (2011.01)
 (Continued)

(52) U.S. Cl.
 CPC ........ *H04N 21/4622* (2013.01); *H04H 20/24* (2013.01); *H04H 20/26* (2013.01);
 (Continued)

(58) Field of Classification Search
 CPC .............. H04N 21/24; H04N 21/2402; H04N 21/4622; H04N 21/44008; H04N 21/6125
 See application file for complete search history.

(56) References Cited

U.S. PATENT DOCUMENTS 5,805,804 A * 9/1998 Laursen .................. H04L 29/06
 348/E5.008
9,009,758 B2 * 4/2015 Foote ................ G06F 17/30796
 725/42
(Continued)

FOREIGN PATENT DOCUMENTS

WO  2011/053858 A1  5/2011
WO  2012/129762 A1  10/2012

OTHER PUBLICATIONS

Haoming Shen et al., *A Hybird System That Supports Pull-type and Push-type AV Content Streaming based on DLNA Technologies*, Consumer Electronics, 2008, XP031297595, pp. 1-2.
(Continued)

*Primary Examiner* — Pinkal R Chokshi
(74) *Attorney, Agent, or Firm* — Workman Nydegger

(57) ABSTRACT

A video content receiving apparatus (103a; 103b) includes an interface (209, 301) for interfacing to at least one associable video reproducing apparatus (102), and including: a receiver for receiving video contents from at least one source of contents (104) through a connection (201a, 203a; 201b, 203b) connected to a plurality of distribution platforms (105, 106), wherein a first connection (203a; 203b) to a first distribution platform (105) is of the broadband type, and wherein a second connection (201a; 201b) to a second distribution platform (106) is of the broadcast type; a first identifier for identifying a video content to be reproduced; a second identifier for identifying at least one active distribution platform on which said video content to be reproduced is currently being transmitted by the source of contents (104); a selector for selecting the reception of the video content through the active distribution platform; a switch for switching between the first connection (203a; 203b) and the second connection (201a; 201b), or vice versa, on the basis of a command signal received by the receiving apparatus
(Continued)

(103a; 130b); and a video processor for generating a video signal (220; 310) that includes the video content in a form that is reproducible by a reproducing apparatus (102) associable with the receiving apparatus (103; 103a; 103b) through the interfacer.

15 Claims, 3 Drawing Sheets

(51) Int. Cl.
    *H04N 21/44*     (2011.01)
    *H04N 21/61*     (2011.01)
    *H04N 21/643*     (2011.01)
    *H04N 21/6543*     (2011.01)
    *H04L 29/06*     (2006.01)
    *H04L 12/64*     (2006.01)
    *H04H 20/24*     (2008.01)
    *H04H 20/26*     (2008.01)
    *H04H 20/42*     (2008.01)
    *H04H 60/13*     (2008.01)

(52) U.S. Cl.
    CPC ....... *H04H 20/423* (2013.01); *H04L 12/6418* (2013.01); *H04L 65/4076* (2013.01); *H04N 21/24* (2013.01); *H04N 21/2402* (2013.01); *H04N 21/44008* (2013.01); *H04N 21/6125* (2013.01); *H04N 21/6143* (2013.01); *H04N 21/64322* (2013.01); *H04N 21/6543* (2013.01); *H04H 60/13* (2013.01)

(56) References Cited

U.S. PATENT DOCUMENTS

| | | | |
|---|---|---|---|
| 2002/0184629 A1* | 12/2002 | Sie | G06F 3/0482 725/41 |
| 2009/0052450 A1* | 2/2009 | Mockett | H04L 1/0009 370/390 |
| 2011/0138064 A1 | 6/2011 | Rieger et al. | |
| 2011/0145869 A1* | 6/2011 | Rahman | 725/87 |
| 2011/0149826 A1* | 6/2011 | Choi | H04N 21/4622 370/312 |
| 2011/0154422 A1 | 6/2011 | Shim et al. | |
| 2011/0246643 A1* | 10/2011 | Kubota | H04N 21/2182 709/224 |
| 2011/0307929 A1* | 12/2011 | Youssefmir et al. | 725/89 |
| 2012/0011557 A1 | 1/2012 | Mathews et al. | |
| 2013/0014159 A1* | 1/2013 | Wiser et al. | 725/34 |
| 2013/0128745 A1* | 5/2013 | Chen | H04L 12/5692 370/237 |
| 2013/0232231 A1* | 9/2013 | Laurent | H04L 65/10 709/219 |
| 2014/0160956 A1* | 6/2014 | Chen | H04N 21/4363 370/252 |
| 2014/0189754 A1* | 7/2014 | Major et al. | 725/67 |
| 2015/0341646 A1* | 11/2015 | Sze | H04N 19/166 375/240.26 |

OTHER PUBLICATIONS

Italian Search Report and Written Opinion dated Feb. 3, 2014, issued in Italian Application No. TO20130437, filed May 29, 2013.

* cited by examiner

VIDEO RECEIVING APPARATUS FOR PROCESSING A VIDEO CONTENT RECEIVABLE FROM A PLURALITY OF DISTRIBUTION PLATFORMS, AND METHOD THEREOF

CROSS-REFERENCE TO RELATED APPLICATIONS

This application claims priority to Italian Application No. TO2013A000437, filed May 29, 2013, which application is hereby incorporated by reference.

DESCRIPTION

Technical Field

The present invention relates to a video receiving apparatus and to an associated method for processing a video content. In particular, the present invention is applicable wherever video reproducing devices, typically in a domestic environment, interact with delivery systems used by video content providers by means of hybrid receiving apparatuses, i.e., apparatuses that can receive and process video contents distributed on different platforms.

Prior Art

Nowadays the systems for receiving and reproducing video contents, e.g., television contents, are rapidly evolving.

For example, television contents are delivered to domestic environments by means of different infrastructures, such as broadcast (terrestrial, cable or satellite, typically digital) infrastructures and network or broadband infrastructures (also known as CDN, or "Content Delivery Networks"). Patent application WO12129762A1 relates to a hybrid system for receiving multimedia contents, which receives contents from a plurality of broadcast networks, also in accordance with the Internet Protocol Television (IPTV) protocol.

As far as domestic delivery of video contents is concerned, systems are becoming widespread such as those specified by the "Digital Living Network Alliance", or DLNA.

In general, broadcast infrastructures have costs that are independent of the number of users actually receiving the content, and are not subject to congestion problems (which are typical of "web" systems); broadcast infrastructures allow for easy delivery of high-quality video signals. The limit of broadcast infrastructures is given by the fact that the radio band on which video contents are distributed is a limited resource, and its use is only justified if the number of users actually receiving a certain content exceeds a threshold dictated by cost criteria.

In general, on the contrary, web-based or broadband network infrastructures have costs that depend on the number of users actually connected and on the traffic produced by each one of them; broadband infrastructures can be subject to congestion problems, especially in the case of services causing high traffic variability, with very pronounced peaks. In addition, managing high-quality signals (i.e., signals with a high bit rate) on broadband infrastructures implies very high costs, especially in the case of video contents intended for a mass audience.

OBJECTS AND SUMMARY OF THE INVENTION

It is one object of the present invention to provide a solution for improving the distribution of video contents.

In particular, it is one object of the present invention to improve the usage of the band available on the video content distribution platforms.

It is another object of the present invention to allow the users to receive and reproduce video contents with better quality without the user or the receiving apparatus being required to inquire beforehand about the availability and quality of different distribution platforms and/or about their usage efficiency, nor to act by any means upon the receiving apparatus.

It is a further object of the present invention to improve the management of the distribution of video contents being transmitted on a plurality of distribution platforms, in particular by allowing the provider of said contents to optimize the use of the available resources, while at the same time minimizing the impact of the method upon the fruition of the contents by the end users.

These and other objects are achieved through a video receiving apparatus and an associated method for processing a video content.

A basic idea of the present invention is to provide a video content receiving apparatus comprising interface means for interfacing to at least one associable video reproducing apparatus, and comprising:
reception means configured for receiving video contents from at least one source of contents through connection means connected to a plurality of distribution platforms, wherein at least one first connection to a first distribution platform is of the broadband type, and wherein at least one second connection to a second distribution platform is of the broadcast type;
first identification means configured for identifying a video content to be reproduced;
second identification means configured for identifying at least one active distribution platform among the plurality of distribution platforms on which the video content to be reproduced is currently being transmitted by the at least one source of contents;
selection means configured for selecting the reception of the video content through the active distribution platform;
switching means configured for switching between the first connection and the second connection, or vice versa, on the basis of a command signal received by the receiving apparatus;
a video processor configured for generating a video signal comprising the video content in a form that is reproducible by a reproducing apparatus associable with the receiving apparatus through the interface means.

The broadcast connection is preferably towards a satellite television platform, whereas the broadband connection is preferably towards an Internet platform.

Preferably, the video content is identified by reading an identifier associated with the video content and preferably received through at least one of the connection means, and the video receiving apparatus is adapted to signal said identifier remotely, i.e., outwards, through at least one of the connections, preferably the broadband connection. Preferably, the video receiving apparatus further comprises signaling means that signal information concerning the plurality of platforms, particularly the usage thereof, and additionally the identifier.

Preferably, the video receiving apparatus comprises at least one connection to a remote server, from which it can receive and to which it can send signals and informative data.

Preferably, the receiving apparatus comprises means adapted to receive commands issued remotely, preferably by the remote server, wherein the means for switching are adapted to carry out switching operations that depend on the commands issued remotely.

A further idea at the basis of the present invention is to provide a method for processing a video content, wherein a video receiving apparatus is adapted to receive video contents from at least one source of contents through a plurality of distribution platforms, wherein the plurality of distribution platforms comprises at least one first broadband distribution platform and at least one second broadcast distribution platform to which the video receiving apparatus is connected, and wherein the video receiving apparatus is operationally associable with at least one reproducing apparatus adapted to reproduce the video contents, wherein the video receiving apparatus carries out at least the steps of:

identifying a video content to be reproduced;

identifying at least one active distribution platform among the plurality of distribution platforms on which the video content to be reproduced is currently being transmitted by the at least one source of contents;

selecting the reception of the video content by the video receiving apparatus through the active distribution platform;

receiving a command signal sent to the video receiving apparatus for switching between the first distribution platform and the second distribution platform, or vice versa;

generating an output video signal comprising the video content in a form that is reproducible by the reproducing apparatus.

Preferably, the broadcast platform is a satellite television platform, since content providers in this field typically make use of a plurality of distribution platforms and can benefit from an optimal usage thereof. Preferably, the broadband platform is an Internet platform.

Preferably, the content is identified by reading an identifier associated therewith, and the video receiving apparatus communicates and transmits the identifier remotely, i.e., outwards, preferably through at least one of the platforms, particularly the broadband platform.

Preferably, the method provides for: signaling information concerning the plurality of distribution platforms from which the receiving apparatus is adapted to receive the video contents, in particular concerning platform usage. Preferably, said signaling of information and/or transmission of the identifier occur towards a remote server.

Preferably, the switching between the first platform and the second platform, or vice versa, occurs as a consequence of the reception of a command remotely sent to the video receiving apparatus, preferably by a remote server. Said command preferably depends on the information concerning the plurality of platforms, or on the identifier itself. In this manner, the switching between the first platform and the second platform, or vice versa, can take place according to criteria established centrally, e.g., by the video content provider, that will thus be able to establish policies of distribution on multiple platforms to optimize the usage thereof, e.g., by using broadcast platforms for a large number of users, or broadband platforms for a smaller number of users or for users dispersedly distributed in places remote from one another.

Other advantageous technical features of the present invention will become more apparent in the light of the appended claims, which are an integral part of the present description.

BRIEF DESCRIPTION OF THE DRAWINGS

Some preferred and advantageous embodiments will now be described by way of non-limiting example with reference to the annexed drawings, wherein.

Figure 1:
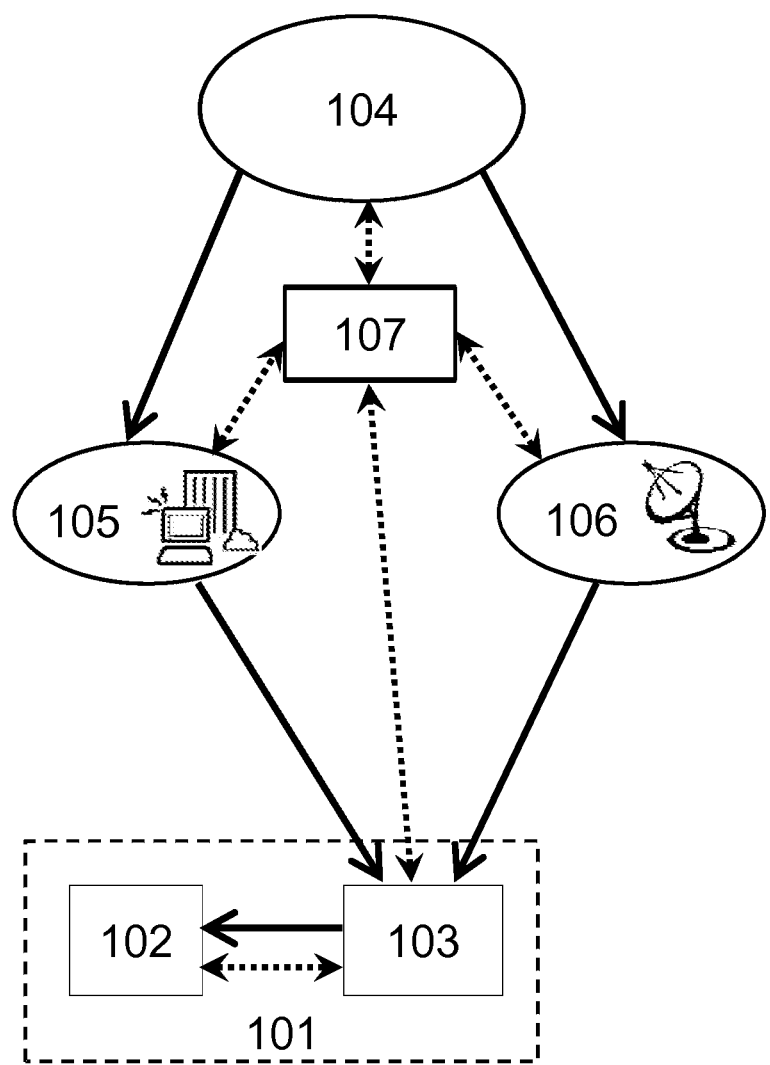
FIG. 1 exemplifies the method for processing a video content according to the present invention.

The drawings illustrate different aspects and embodiments of the present invention and, where appropriate, similar structures, components, materials and/or elements are designated in the different figures by the same reference numerals; a different final letter appended to the same reference numeral indicates a different embodiment of the same element.

DETAILED DESCRIPTION OF THE INVENTION

The present invention falls within the field of television technologies (in particular satellite ones), wherein set-top boxes or receiving apparatuses are also connected to the Internet network.

In addition or as an alternative to the above, the present invention is applicable to the field of the DLNA technology (or video content sharing systems based on equivalent principles).

It is provided that a generic video content is preferably distributed at least through a broadband distribution platform of the CDN (Content Delivery Network) type, i.e., wherein costs are proportional to the number of users viewing the video content; this scenario is becoming increasingly widespread, especially with the adoption of broadband systems such as, for example, LTE mobile phones. One example of a broadband distribution platform is represented by the Internet network.

It is provided, in particular, that the video content is distributed on broadband platforms according to "live streaming" modes to ensure synchrony and contemporaneousness of the content itself for all users who are watching it.

For simplicity, the present description refers to "video contents" to indicate audiovisual contents comprising video and audio components, possibly together with associated informative, signaling or control data (EPG data, teletext data, MHP data, source or channel identifiers, etc.), such as, for example, those included in an MPEG transport stream compliant with the specifications of the DVB, ATSC, etc. standards.

It is also provided that the reproducing apparatuses (hereafter also referred to, for brevity, as "players"), while they are reproducing a video content being received in "streaming" from a CDN, can carry out other functions which are useful for controlling the CDN itself. The players are therefore adapted to operationally connect (through a wired or wireless connection, possibly established by simply installing a specific application) to receiving devices, which can communicate to the content provider (by means of servers they are connected to) the following information: the type of player that is reproducing the content, if the player is in a network, e.g., a DLNA network, and if devices are available in said network for receiving data from other platforms, e.g., broadcast platforms.

Such information is then signaled "outwards", i.e., to devices and/or apparatuses remote from the video receiving apparatus, which are therefore located outside the domestic environment and are available to the content provider or to the provider of the connection services of the platforms used by content providers.

With this information, the systems employed by the content provider are able to: notify the player if the video content is available on a platform, in particular a broadcast platform, to which the receiving apparatus can connect, e.g., by displaying an icon on the screen or by sending a message to another apparatus of any kind; in this case, the user may decide to switch the reception of the video content to the broadcast platform in order to, for example, benefit from higher video quality.

With such information, the systems employed by the content provider can also stop the streaming and automatically activate the reception on the broadcast network, if this is allowed by the service profile of the user involved.

With such information, the systems employed by the content provider can also activate a particular broadcast platform, in the event that the CDN is overloaded by a large number of connected users and the video content is not yet distributed on a broadcast platform; the content provider can thus evaluate the convenience of occupying broadcast resources intended for distributing video contents that occasionally (and unpredictably) undergo share peaks; the activation of such distribution on a broadcast platform allows to "migrate" a certain number of users (those who can support this procedure, and who are known to the content provider thanks to the above-mentioned notifications) to broadcast distribution, thereby "easing" the load on the CDN.

Likewise, the systems employed by the content provider can also deactivate a broadcast platform in the event that the video content is being watched by a small or anyway insufficient number of users, and then activate a particular CDN on which the same video content will be transmitted and to which the users' receiving apparatuses will be automatically switched by means of a remote command. The content provider can thus evaluate the convenience of freeing up broadcast resources for distributing low-rating video contents; the activation of such distribution on broadband platforms will not excessively load the CDN, while at the same time freeing up broadcast resources which can be used for other transmissions, e.g., different video contents.

The method may be subject to many variations, in particular if the network to which the player is connected is a public network, with a structure made up of "islands" equipped with servers suitable for performing the functions of a DLNA server or similar functions. Such "islands" may be wireless hotspots or single cells of a cellular network. In such a case, the method may include a variant according to which the content provider can retrieve the above-mentioned information not only from the player, but also from the receiving apparatuses themselves. The information transmission procedure could thus be carried out in several ways, provided that the information is retrieved and then transmitted to the management systems by the content provider.

With reference to FIG. 1, the following will describe one exemplary and non-limiting embodiment by means of functional blocks that may or may not coincide with distinct physical apparatuses or devices, or may be systems or apparatuses comprising multiple devices, or may be functions integrated into a single apparatus that may also carry out additional functions.

The video receiving system 101 comprises at least one reproducing apparatus 102 or player 102. The player 102 may be, for example, a television set connected to a DLNA network, or a tablet PC, etc., adapted to reproduce a video content, or a traditional television display adapted to be connected to a receiver/decoder or a set-top box.

The video receiving system 101 further comprises at least one video receiving apparatus 103, which may also include functions for decoding the video stream and delivering it to the reproducing apparatus 102. The video receiving apparatus 103 may be, for example, a hybrid set-top box connected to a plurality of distribution platforms, including satellite platforms, as will be described below. In general, the receiving apparatus 103 may comprise a plurality of additional functions.

Figure 2:
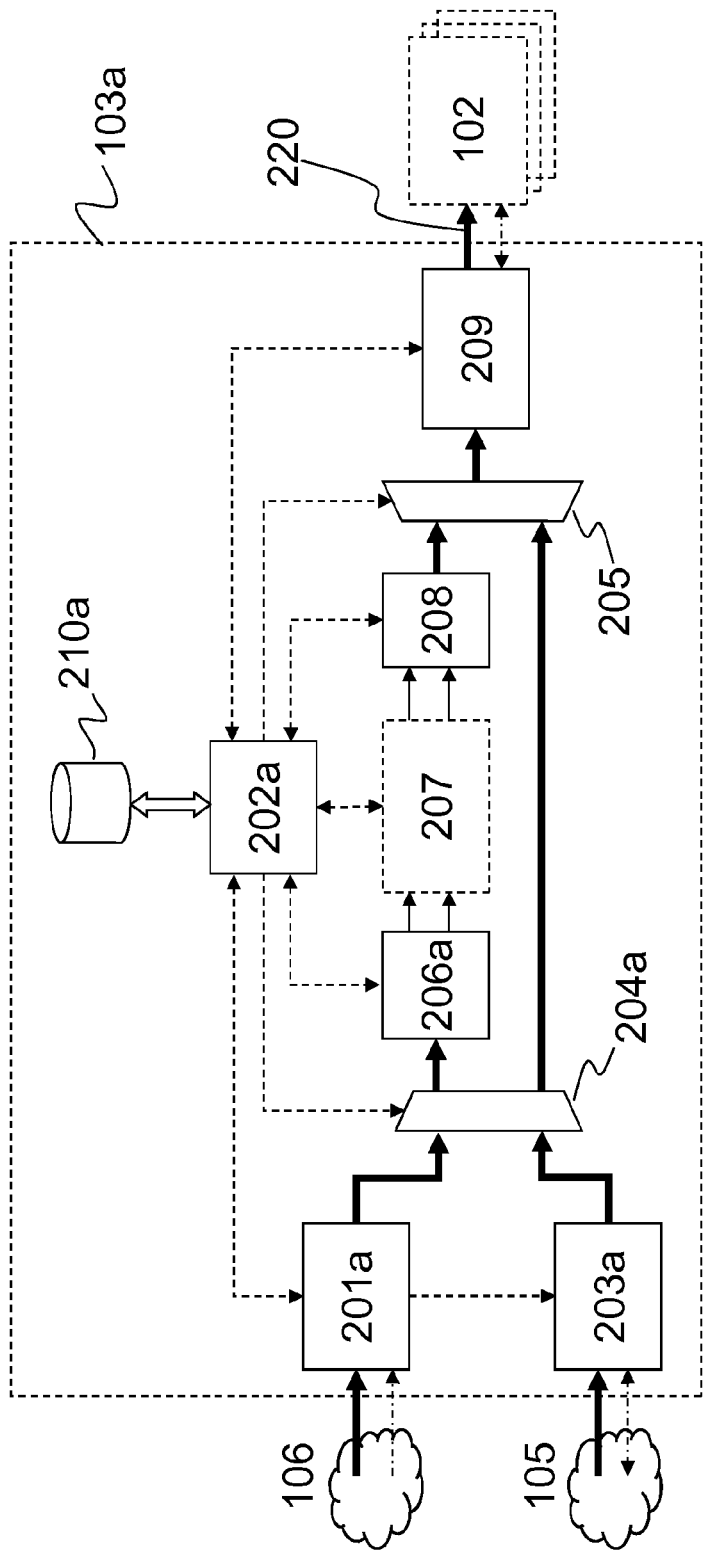
FIG. 2 exemplifies a block diagram of a first embodiment of the receiving apparatus.
Figure 3:
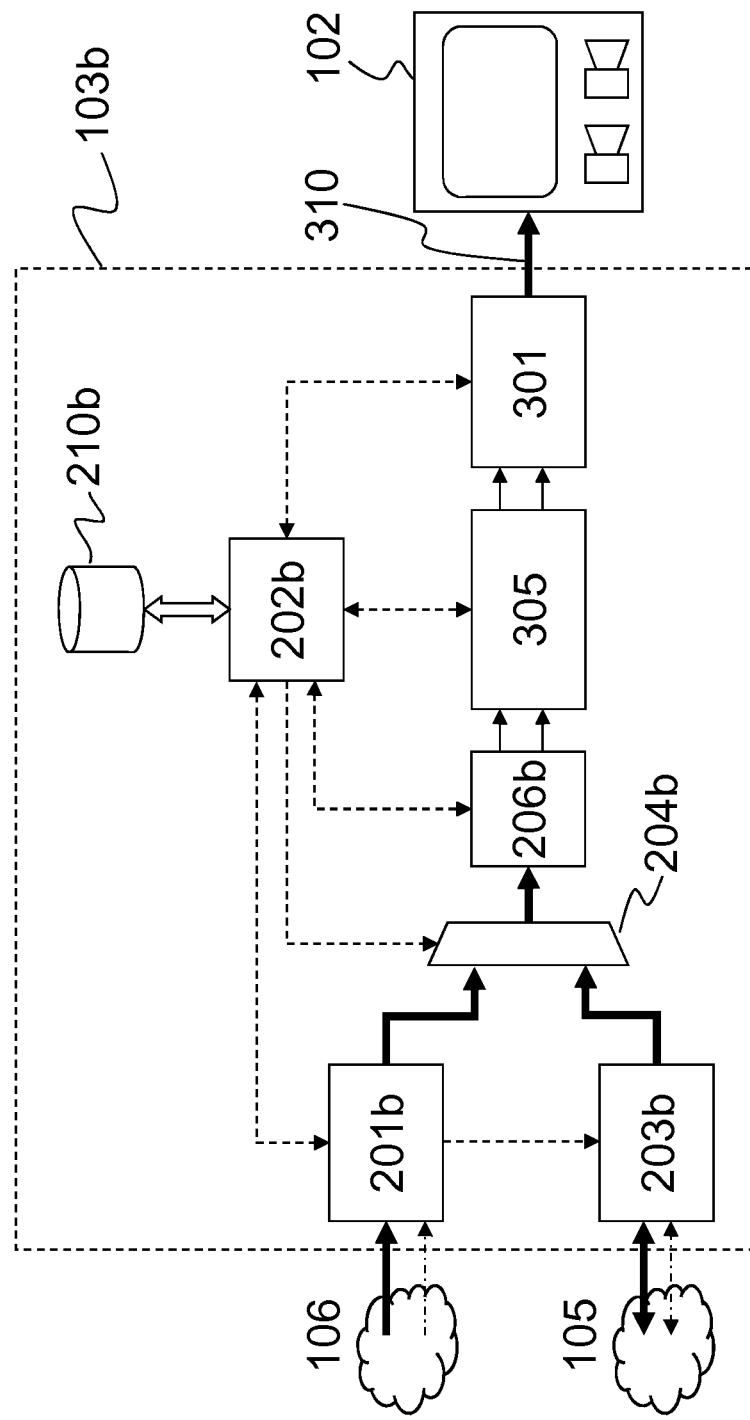
FIG. 3 exemplifies a block diagram of a second embodiment of the receiving apparatus, i.e., a hybrid set-top box according to the invention.

FIGS. 2 and 3 show in detail the structure and operation of a first embodiment of a receiving apparatus 103a according to the invention and of a second embodiment of a receiving apparatus 103b according to the invention.

In this regard, a scenario can be assumed wherein a plurality of reproducing apparatuses 102 are connected to one same receiving apparatus 103; for simplicity, however, FIG. 1 shows only one of them.

According to another preferred embodiment of the video receiving apparatus 103, the latter includes a connection to at least one satellite dish, a satellite decoder, e.g., of the DVB-S type, and also an Internet connection, e.g., of the LAN or Wi-Fi type, thus being a hybrid set-top box.

The video contents to be reproduced originate from a source of contents 104, which may also represent a plurality of aggregated sources. In general, video contents are managed by the video content provider and are made accessible to the users through the source of contents 104.

Two types of distribution (delivery) platforms are involved: broadband platforms 105, such as CDN's based on web/telecom/Internet broadband networks, which are subject to congestion as the number of users simultaneously using them increases, and broadcast platforms 106 (satellite, digital terrestrial, cable, etc.), which on the contrary are not sensitive to the number of users simultaneously connected thereto.

According to the invention, the connection to the distribution platforms 105 and 106 is based on the exchange of suitable information among the various functional blocks shown.

In particular, it is provided that the video reproducing system 101 is adapted to establish operational connections among the various functional blocks, both internally (towards the receiving apparatus 103 and the reproducing apparatus 102) and externally (towards the platforms 105 and 106). It is also provided that the video reproducing system 101 can execute commands issued by the user or by the content provider, as will become apparent below.

It is also provided that the video reproducing system 101 is adapted to interface to a remote server 107, operationally connected thereto and exchanging messages and information therewith according to suitable protocols established by the receiving apparatus 103. Therefore, the remote server 107 will be hereafter referred to as "Delivery Management Server".

According to the preferred embodiment exemplified herein, the video system 101, in particular the video receiving apparatus 103, is adapted to communicate to the Delivery Management Server 107: the video content currently being reproduced; the distribution platform from which it is being received, i.e., 105 or 106; the source 104 it is coming from; the alternative distribution platforms to which the system is connected, i.e., the platform 105 or 106 other than the one specified above.

The Delivery Management Server 107 is therefore adapted to monitor: the state of the broadband platform(s) 105 to which the video receiving apparatus 103 is adapted to connect; the band available on said broadband platform 105; the possible presence of a transmission of the video content on a broadcast platform 106 available to the video receiving apparatus 103.

The Delivery Management Server 107 is further adapted to calculate or evaluate which distribution platform, between the broadband platform 105 and the broadcast platform 106, is most suitable for currently distributing the video content in question. Several criteria can be used, e.g.: a lower economical cost for the content provider; a higher bit rate delivered to the user (in general, if possible and justified by the number of active users, it is always preferable to use broadcast distribution).

The Delivery Management Server 107 is further adapted to inform the provider of the contents of the source 104 about the appropriateness of switching to another distribution platform, on the basis of suitable economically/statistically determined criteria.

The Delivery Management Server 107 is further adapted to control the video receiving apparatus 103 in order to switch the reception to the chosen platform. The Delivery Management Server 107 may possibly request an authorization prior to cause the receiving apparatus to switch; said authorization may be either automated or given by the user him/herself.

FIG. 2 shows in detail the basic structure of a video receiving apparatus 103a according to an exemplary embodiment of the invention. Control and signaling lines are drawn with a dashed line, while signal connection lines are drawn with a continuous line; the latter is thicker where the video content is encapsulated into a container stream that may potentially contain also other contents, such as metadata; optional blocks are represented with a dashed contour. Therefore, the elementary components of the video content, such as the video component and the audio component, are drawn with a thin line. The video receiving apparatus 103a comprises a tuner 201a, e.g., of the DVB-T or T2, DVB-S or S2, DVB-C or C2 type, that can tune the reception to a video content, which is encapsulated into any one container format that can be used for transmitting television signals, such as the MPEG2 transport stream. Into the transport stream, further signals or control commands may also be encapsulated, which come from the service provider and which can be used by the receiver. The tuner 201 and the other functional blocks can be controlled by the control unit 202a of the apparatus (CPU), which usually consists of a microprocessor capable of supervising the operation of the whole apparatus 103a. Therefore, the control unit 202a is shown to be connected to the other functional units of the video receiving apparatus 103a by means of suitable signaling and control lines, typically bidirectional ones, through which the control unit 202a can receive data about the operating state of the other units connected thereto, and can send specific commands to such units.

The video receiving apparatus 103a is also equipped with an input IP interface 203a, e.g., a transceiver capable of receiving and transmitting digital packet data according to the TCP/IP system, whether via a LAN network or wireless protocols. In this case as well, the video content (e.g., a digital television service) is typically encapsulated, along with other television services of the same kind, into a container stream (e.g., an MPEG transport stream). The output signals of the tuner 201a and of the IP interface 203a are supplied to an input selector 204a, which can convey one of the two input signals to one of the two output terminals, based on the selection command received at its input connected to the CPU 202a.

The tuner 201a and the IP interface 203a are the means that connect the video receiving apparatus 103a to the video distribution platforms 105 and 106, respectively.

The video receiving apparatus 103a shown in FIG. 2 preferably comprises two different internal video content processing lines, arranged between the input selector 204a and an output selector 205, which has two input terminals and one output terminal.

This two-way parallelism in the processing lines is advantageously well suited to the characteristics of the reproducing apparatuses (tablet PC, smartphone, etc.) that can be associated with the output of the video receiving apparatus 103a, and to the transmission band available on the connection channel for the output signal 220 between the video receiving apparatus 103a and the reproducing apparatuses 102.

If the reproducing apparatuses 102 cannot transmit, receive and process an entire container video stream comprising different video contents (e.g., television services) and extract from the container video stream that particular video content selected by the user, then the lower line, consisting of a simple by-pass, will be used for reproduction; this mode is advantageously used in accordance with criteria that will be described in detail below.

On the contrary, if the band available for transmitting the output signal 220 of the IP interface 209 on the connection line between the video receiving apparatus 103a and the reproducing apparatuses 102 is limited, or the reproducing apparatus 102 can only process container streams containing just one video content, then the input video stream containing the selected video content will advantageously be diverted to the upper internal line, where the audio and video components of the video content will be extracted from the input stream by means of a demultiplexer 206a, optionally decoded and coded again by means of a bank of audio and video encoders and decoders 207, and then multiplexed by a multiplexer 208 into an output container stream, which will thus contain only that video content in a form that will be directly processed by the reproducing apparatus involved.

In general, the coding/decoding operation may be included if the player only supports particular source decoding methods, or if the original audio and/or video signal needs to be compressed more due to the limited band available on the connection channel between the receiving apparatus 103a and reproducing apparatuses 102.

In both of the above-described cases, the output selector 205 will convey the video stream, thus processed, from the internal lines to the single output, from which it will be transmitted to the reproducing apparatuses connected via the output IP interface 209. The latter may use, for transmission to the players, a connection line or channel for the output signal 220 compliant with the DLNA protocol, in turn based on the TCP/IP protocol, whether by means of an Ethernet cable connection or a wireless (Wi-Fi) connection or other known types of connections.

The video receiving apparatus 103a may additionally include at least one bank of video and audio processors, not shown in FIG. 2, which receive the output signals of the bank of video and audio decoders and associate them, via a suitable connection line, with an audiovisual reproducing apparatus 102 capable of reproducing already decoded audio and video streams, as will be explained more in detail in the description of FIG. 3.

At any rate, the output IP interface 209 and the bank of audio and video processors, if present, are means for interfacing to at least one reproducing apparatus 102 associable with the video receiving apparatus 103a, to which they can deliver the video content in a form that it is capable of reproducing.

Of course, the video content generally also contains other signaling and control data, such as the station name, the title of the program being transmitted, the transmission frequency, the name of the bouquet or container transport stream, as well as useful informative data such as a teletext service, EPG (Electronic Program Guide) data, MHP (Multimedia Home Platform) data; for simplicity, FIG. 2 (and the next FIG. 3) only show the flow lines of the audio and video components.

In particular, if the band available on the output IP interface 209 is limited, it is better that the multiplexer 208 outputs a transport stream containing only the video content to be reproduced on an associated reproducing apparatus; if, for example, the user has selected the digital TV service "RAI3", then the multiplexer 208 will generate an output container stream comprising only those components (audio, video, teletext, ancillary data, EPG data, station name, program title, etc.) that belong to the digital service "RAI3", discarding all components belonging to other video contents, e.g., those of "RAI1", "RAI2" and "RAI4", which are present in the input container stream.

The following will illustrate in more detail the operation of the video receiving apparatus 103a according to the invention.

Let us assume that the user of the reproducing apparatus 102 has selected a certain video content to watch, e.g., the program being transmitted on the television network "RAI3", for example the musical event entitled "Concert of May 1st".

The video receiving apparatus 103a receives the user's request from the bidirectional output DLNA interface 209, and its CPU 202a commands the tuner 201a to tune to the transmission channel whereon said concert is being broadcast, i.e., the one corresponding to the television service "RAI3", through the broadcast platform 106.

Let us also assume that the television network "RAI3" is also being transmitted on the CDN platform 105 at the same time, and can therefore be received by the video receiving apparatus 103a also through its input IP interface 203a.

If the reproducing apparatus(es) connected to the video receiving apparatus 103a can extract the video content from the transport stream, then the CPU 202a of the video receiving apparatus 103a will command the input selector 204a to divert the input stream to the lower by-pass line, and will command the output selector 205 to convey the signal present on said line towards the output IP interface 209. The CPU 202a thus knows which video content is being reproduced on the reproducing apparatus, e.g., "RAI3", and may additionally, by means of a suitable interrogation, receive from the reproducing apparatus the information concerning the title of the program being reproduced, i.e., "Concert of May 1st", which the latter apparatus has extracted from the demultiplexed container stream. Moreover, the CPU 202a knows which transmission platform (either 105 or 106, in this example 106) is being used for receiving and reproducing the video content: if, for example, the tuner 201a is of the DVB-T type, the television broadcast platform 106 will be the DVB-T digital terrestrial television broadcast network.

In the event that, differently from the above assumption, it should be necessary to send to the reproducing apparatus a container stream including only the selected video content, the upper internal processing line will be used for reproduction. In such a case, the demultiplexer 206a will extract the components of the video contents encapsulated into the container stream, and may send to the CPU 202a, in addition to the station name, e.g., "RAI3", which however the CPU already knows because that information has been received in the request from the reproducing apparatus, also the title of the program being transmitted, the duration thereof and other information concerning the video content to be reproduced, since such information is also encapsulated into special fields of the transport stream.

The CPU 202a will store, in a manner established by the installed firmware, e.g., into a memory 210a associated with it, the video content identifier allowing the service provider 104 to identify the video content. The identifier may comprise, for example, the station name "RAI3", the LCN code (Logical Channel Number), a station identification code associated with the television service "RAI3", one or more values of the fields specified for this purpose by the television standardization bodies (e.g., for the MPEG transport stream: Network_Name, Network_Country_Code, Network, Operator Network_ID, Original Network ID, Platform_ID, Bouquet_ID, etc.), which will be transmitted, along with the video content, on any one of the available distribution platforms. The video content identifiers may vary among the various platforms while still identifying the same video content, and may also contain indications about the type of platform being used for transmitting the video content, even though—as aforementioned—the video receiving apparatus 103a already knows such information.

The CPU 202a causes the video content identifier to be sent to a remote server managed by the video content service provider, e.g., to the server 107, for example via the input IP interface 203a, which allows bidirectional communication to and from the receiving apparatus 103. Preferably, the CPU 202a also commands the transmission of a datum signaling the distribution platform in use for reception (in this example, the broadcast platform 106, e.g., DVB-T). As an alternative, the transmission may also take place by means of a dedicated line, e.g., via a modem connected to a telephone line.

In this manner, the provider of the video content 104 (RAI in this example) comes to know on which one of the various available distribution platforms a given video content (in this example, the TV service "RAI3" transmitted on the DVB-T platform and on the Internet CDN platform) is actually being received by the user. If RAI decides, for whatever reason, to modify the usage of the distribution platforms for transmitting the video content ("RAI3" via DVB-T or Internet platform), it can have the remote server 107 send a command inducing a part or all of the receiving apparatuses 103 that are receiving "RAI3" to change the reception platform in use in order to adjust the usage distribution to the new requirements of the provider 104. For example, if the "Concert of May 1st" is not being watched by many televiewers, the remote server 107 may switch all the receiving apparatuses 103 to the Internet CDN platform, and may start transmitting something else on the DVB-T broadcast channel that was previously occupied by the service "RAI3", e.g., another television service, or may even stop broadcasting to economize. Additionally, the CPU may notify the reproducing apparatus about the change of platform that has occurred, possibly along with other associated information, e.g., the program or service which is about to be transmitted with the DVB-T protocol on the broadcast channel that was previously occupied by "RAI3". Upon receiving this notification, the reproducing apparatus 102 may display on the screen a message warning the user about the fact that the platform used for receiving the video content being played has been changed.

If RAI decides to modify the usage of the distribution platforms for "RAI3", it may send a switching command on different platforms, via the remote server 107, according to the case. If, for example, one wants to switch all receivers of "RAI3" to a specific platform, then it will be possible to use both the broadcast platform 106 and the broadband platform 105 for transmitting the command. On the contrary, if one only wants to switch a part of the users (e.g., changing the percentage of users receiving the video content on the broadband platform 105, e.g., Internet, from 30% to 50%), then it will be advantageous to send the switching command via the same broadband platform 105, which allows sending point-to-point signals to a specific subset of receiving apparatuses 103 that can be reached individually because they are identified by a specific address (i.e., the IP address), known to the service provider, due to the very nature of the operating mechanism of an IP network. This is not allowed, instead, by a broadcast platform 106, which for its very nature will send the same content simultaneously to all tuned receivers within the coverage area, without the possibility of excluding some of them.

If one wants to use a channel of the broadcast platform 106, it will be necessary to send a switching command associated with an identification code, in turn associated with each receiving apparatus 103 (e.g., the subscription number or the serial number of the receiving apparatus 103), to all the receiving apparatuses 103 involved, one after the other (but it would however be sent also to those not involved). The CPU 202a knows such code, since it is permanently stored in the memory 210a; if the code associated with the switching command matches the code detected by the CPU 202a, then it will execute the switching command. In order to use the above-described mechanism, the service provider must know beforehand the identification codes of the receiving apparatuses 103 that are receiving the video content to be switched ("RAI3" in this example); this scenario is more likely to occur when the receiving apparatus is a proprietary set-top box, i.e., it is supplied by the service provider itself.

Such a scenario is more frequent when the video receiving apparatus is a hybrid set-top box for satellite television. It is conceivable that, whether periodically or at every new selection of the video content to be reproduced, the CPU 202a sends to the remote server 107 not only the video content identifier, but also its own identification code. As an alternative, the CPU 202a may also send to the remote server 107 its own IP address, the MAC address of the IP interface 203 and/or any other information that can univocally identify the receiving apparatus 103a. Transmission can take place through the input IP interface 203a, which is connected to the remote server 107 through the Internet, or else by means of a dedicated line (e.g., the telephone line). The transmission of the receiver identifier may be omitted if the remote server 107 is able to identify by any other means the sender of the data received from a receiving apparatus, as is the case of IP data packets containing the packet source address.

The command issued by the service provider 104 via the remote server 107 may advantageously be a conditional one, i.e., a command like the following one, or anyway conditionally interpreted by the receivers: "if you, receiving apparatus, are receiving the video content X through platform 1, then from now onwards you will have to receive it through platform 2, by switching between platforms". In such a case, the CPU 202a is adapted to verify if the receiving apparatus 103a meets the above condition, and will only effect the switching in the affirmative case, so as to avoid any undesired switching of platform and/or of received video content if the condition is not met.

As to the specific position where the command is entered into the container stream by the provider, private data may optionally be present into which the producer of the transport stream can enter non-standardized proprietary information. Such non-standardized proprietary information is useful for particular purposes, such as those conceived by the present invention, since any receiving apparatuses not compliant with the present invention would be free to ignore such information. In general, the commands intended for the receiving apparatuses 103 may be transmitted as executable code, as source code instructions (e.g., JAVA language or MHP code), or as simple informative data, the key of which is stored in the receiving apparatuses 103a, so that the CPU 202a can interpret them correctly.

What has been said in the preceding paragraphs about the management of the transmissions on the available video distribution platforms (105, 106) applies to any kind of receiving apparatus 103, 103a or 103b.

Many variants of the embodiment of the receiving apparatus 103a shown in FIG. 2 can be conceived. For example, further interfaces may be included for further broadcast and/or broadband video content distribution platforms: for example, there may be one interface for the DVB-T/T2 platform and/or one for the DVB-S/S2 platform and/or one for the Wi-max platform and/or one for the LTE platform, and so on.

The receiving apparatus 103a may have more than two internal lines for processing the video content (whether of the by-pass type or of the demultiplexing and remultiplexing type), so that different associated reproducing apparatuses 102 can be served simultaneously, each one capable of reproducing, at a given instant, diversified video contents. In general, the input and output selectors of the receiving apparatus 103a may be different, but the operation of the processing method according to the invention will remain the same and will still be applicable without any difficulty.

Also, it is not strictly necessary that the input IP interface 203a is physically distinct from the output one 209: in principle, the operating mechanisms which are typical of the IP protocol allow the tasks of said two IP interfaces to be carried out by one physical IP interface (e.g., provided in the form of a TCP/IP transceiver), but for simplicity such functions are shown in the drawings to be performed by separate IP transceivers.

FIG. 3 shows a further example of embodiment of a video receiving apparatus 103b according to the invention, provided in a particular form of hybrid set-top box.

For simplicity, it is assumed that the video receiving apparatus 103b lacks the output IP interface for connection to the reproducing apparatuses, being instead equipped with an audio-video connection interface for a reproducing apparatus (Audio & Video reproducer) associable therewith.

The input stages of the video receiving apparatus 103b (i.e., the input IP interface 203b, the tuner 201b, the CPU 202b, the memory 210b and the input selector 204b) substantially coincide with the elements previously described with reference to the video receiving apparatus 103a of FIG. 2 (with the suffix "a" added to the reference numeral), and they operate in substantially the same way, in accordance with the processing method of the invention. For brevity, therefore, said elements will not be described any further, and the following will only tackle the differences between them.

As in the case shown in FIG. 2, it is assumed that the tuner 201b and the IP interface 203b are the means for connecting the apparatus 103b to the video distribution platforms 105 and 106, respectively. As in the previous case relating to the video receiving apparatus 103a, also in this case it is possible to include other connection means for other video distribution platforms, the characteristics of which means will change depending on the platform they will interface to and on the nature of the received video signal.

First of all, the structure of the video receiving apparatus 103b is simpler than the structure of the video receiving apparatus 103a of FIG. 2, since there is no output IP interface for transmitting the audio-video signal in reproducible form. In particular, the video receiving apparatus 103b preferably comprises a single internal processing line, so that it is no longer necessary to employ an output selector, and the video content needs not be re-coded, but only decoded; likewise, there is no need for a multiplexing unit for encapsulating the video content into a container stream to be supplied to an output interface.

In the case of the video receiving apparatus 103b, the video content to be reproduced, e.g., the television service "SKY TG24", is directly communicated to the video receiving apparatus 103b by the user by means of a keyboard or a remote control, not shown in FIG. 3; in this example, the user will type in the program number "500".

The only selector present 204b (corresponding to the input selector of FIG. 2) selects the container video stream comprising the video content to be reproduced on the reproducing apparatus 102 through the input interface fed by the distribution platform 105 or 106 via the input IP interface 203b or via the tuner 201b, respectively, as decided by CPU 202b according to the already described criteria, and as signaled via a dedicated signaling and control line.

The stream selected by the selector 204b is supplied to a demultiplexer unit 206b, which extracts the components (audio, video, EPG, teletext, identification data) of the video content to be reproduced. The audio and video components are decoded by suitable decoders 305 (e.g., compliant with the MPEG2, MPEG4, HEVC, VC1 standards for video and with the AAC, AAC+/HE-AAC, AC3, MPEG1 layer 3, MPEG2 layer 1 or 2 standards for audio), in compliance with the audio and video coding methods used by the service provider when producing the content.

The audio and video components are supplied to suitable audio and video processors 301, which subject the signal to the adaptations necessary for delivery to an audio-video reproducing apparatus 102, which is coupled to the output audio-video interface of the processors 301 by means of a connection line for the output signal 310. The adaptations made by the processors 301 will vary according to the characteristics of the interface (analog with separate audio and video, the latter being of the type with Y, PB/CB, PR/CR, RGB components or CVBS composite video, or digital, e.g., DVI and S/PDIF, or with unified HDMI audio-video) and of the reproducing apparatus 102 itself (for example, taking into account the video resolution supported by the screen of the reproducing apparatus 102). Of course, an output IP interface may additionally or alternatively be present to feed other players via the same number of connection lines for output signals 310 coming from the processors 301, e.g., players compatible with the DLNA protocol.

Let us assume that the players 102 connected to said interface are to be fed with the same video content being sent to the audio-video interface.

If a "narrow" container stream is needed, i.e., comprising only the video content to be reproduced, downstream of the demultiplexer 206b a splitter (not shown) may be arranged to additionally supply the components of the video content to be reproduced to a multiplexer (not shown) like the one indicated with 208 in FIG. 2, connected to the output IP interface.

If, on the contrary, the whole container stream were to be sent to an output IP interface (not shown), it will be sufficient to interpose, between the input selector 204b and the demultiplexer 206b, a two-way splitter that will feed the selected stream to both the demultiplexer 206b and a by-pass line (not shown) connected to the output IP interface (not shown) to be added.

In both of the above cases, it will still be possible to simultaneously send the same video content to different reproducing apparatuses 102.

Finally, should one want to send different video contents on the audio-video interface 301 and on the output IP interface (not shown), one will have to increase the degree of video processing parallelism of the apparatus, as already described with reference to the parallel processing lines of the video receiving apparatus 103a of FIG. 2.

The video processor 301 and the output IP interface possibly present in the video receiving apparatus 103b constitute, combined together, the interface means for interfacing to at least one reproducing apparatus 102 associable with the receiving apparatus 103b, to which they can supply the video content in a form that it can reproduce.

The reproducing apparatus 102 may be, without distinction, either external or integrated with the receiving apparatus 103b: in this latter case, a reproduction system is formed which consists of a single apparatus similar to a television set.

Numerous implementation variants are possible with respect to the exemplary diagrams shown in FIGS. 2 and 3: the functions carried out by some functional blocks may be performed by the same unit, and units represented as separate entities may be integrated into a single physical component or, vice versa, tasks which in FIGS. 2 and 3 are carried out by the same unit may be performed by different functional blocks. For example, the CPU and the audio and/or video decoders may be implemented on the same integrated circuit, the decoders may be totally implemented as hardware, software or a combination thereof, and so on.

Also in the light of the above description, a preferred embodiment of the present invention is the one in which the video receiving apparatus 103a is replaced by a video receiving apparatus 103b such as a satellite and Internet (hybrid) set-top box, i.e., a set-top box comprising a connection to a satellite dish and also a connection to the Internet, e.g., of the LAN or WiFi type.

The reproducing apparatus 102 may therefore, for example, comprise one or more television displays operationally connected to the video receiving apparatus 103b. In the case of satellite television (in particular pay television), the video receiving apparatus 103b comprises functionalities defined by the content provider in order to meet signal encryption/decryption or service billing requirements. As aforesaid, the video receiving apparatus 103b, e.g., a hybrid satellite set-top box, further comprises an Internet connection 203b, through which it is possible to download software/firmware updates as well as gain access to on-demand video contents. The satellite television content provider can thus simply and immediately, by means of a return channel that uses said connection, monitor the video receiving apparatus 103b and the requests for video contents made by the users. Therefore, a satellite television content provider will happen to be in a privileged condition to implement a Delivery Management Server 107 controlled by means of the above-describe functionalities.

For example, let us assume that a user, by means of his/her own video receiving apparatus 103b, is watching a particular video content via the broadband platform 105, i.e., the Internet, e.g., an on-demand live sports event. The content provider knows which video content the user is watching thanks to the Internet return channel, through which the video receiving apparatus 103b communicates with its Delivery Management Server 107 by sending the identifier of the video content being reproduced by an associated reproducing apparatus. Advantageously, the video receiving apparatus 103b also sends information about the particular platform (e.g., satellite broadcast or broadband) in use for receiving the identified video content. In this manner, the service provider can come to know the audience of a certain video content being transmitted (e.g., the program being broadcast on a television service such as "RAI2" or "BBC3"), as well as the proportions in which the content transmission platforms are actually being used by the users in catchment area. Therefore, the service provider can make appropriate decisions about how to manage the distribution of the video content, possibly changing, if necessary, the platform in use by the video receiving apparatuses. For example, based on information collected from the users in the catchment area, the service provider may determine that a certain television program (e.g., a music concert) that is simultaneously available on both the satellite platform and the Internet CDN is being watched by 70% of the spectators via satellite broadcast and by the remaining 30% via the broadband platform. If the usage of the broadband platform decreases under a level considered to be critical, then the service provider may disable the use of that platform for that video content, after having caused to switch to the parallel broadcast platform all the video receiving apparatuses 103 that were using the broadband platform for receiving said music concert. In this way, the service provider will be able to use the CDN for other services, or anyway to economize, if the cost of the CDN depends on the traffic it has to handle.

By statistically analyzing in a centralized manner the information sent from the video receiving apparatuses 103b to the Delivery Management Server 107, the content provider can evaluate the appropriateness of transferring the on-demand program being displayed either to a different platform or to an available satellite channel 106 currently not in use. In fact, the satellite television content provider, due to the larger available band, has at its disposal more satellite channels than it uses on average for its transmissions, so as to be able to broadcast a larger number of video contents when peaks of requests occur, e.g., during particular sports events such as the championships of the most followed sports, e.g., the Football World Cup. The satellite television content provider can thus benefit, if the circumstances that can be verified via the Delivery Management Server 107 allow, from migrating the video content requested by the users to a satellite channel 106; that satellite channel may otherwise remain unused, while the satellite content provider has interest in making the most use of its channels, resorting to broadband/CDN systems 105 only when strictly necessary.

The satellite television content provider can thus have at its disposal suitable modalities for controlling the distribution of video contents on either satellite or broadband distribution platforms, through the intervention of the control logics of the Delivery Management Server 107.

Several control modalities can be conceived as concerns the distribution of video contents by the Delivery Management Server 107: the Delivery Management Server 107 may directly manage the request commands sent to the content provider at the source 104 and then "force" the switching of the video receiving apparatus 103, 103a or 103b, or it may delegate the video receiving apparatus 103, 103a or 103b to perform the switching operations, as shown in the examples of embodiment of FIGS. 2 and 3. Likewise, the Delivery Management Server 107 may be in charge of activating the transmission on a given platform, e.g., said broadcast platform 106, or it may delegate this task to the content provider that manages the content source 104, depending on the management policies adopted.

It is to be understood that the functionality exemplified herein with reference to the Delivery Management Server 107 may be carried out by dedicated devices, or may be a function carried out in a centralized or distributed manner, or may be integrated into the systems that constitute a CDN.

It is therefore provided that a video receiving apparatus 103a, such as a DLNA server, or a video receiving apparatus 103b, such as a hybrid set-top box, are adapted to exchange information concerning the alternative options available for reproducing video contents on the players 102 of their network.

It is also provided that a Delivery Management Server 107 is adapted to evaluate which single video content streams can be removed from CDN, if necessary, because they can be reproduced by players having access to the same video contents via alternative distribution platforms. It is also provided that a Delivery Management Server 107 supervises all functions for coordinating all the system elements involved, such as the video reproducing system 101, the CDN systems 105, the broadcast platforms 106, the video receiving apparatuses 103a or 103b, and the players 102.

In particular, it is provided that suitable messages are entered into the video content request protocol (e.g., the DLNA protocol) for communicating to the content provider 104 the reception potential of the players 102 through the video receiving apparatus 103a or 103b, as well as suitable messages for signaling to the players 102 the possibility of switching (and possibly forcing the switching) between one distribution platform and another.

INDUSTRIAL APPLICABILITY

The method for processing video contents and the video receiving apparatus according to the invention allow video content providers to monitor in real time the video reception/reproduction potentialities of the connected reproducing apparatuses, as well as the video contents being reproduced and the distribution platforms being used for receiving them. Thanks to such information, content providers can cooperate with the CDN operators to distribute the contents through the different platforms available, aiming at optimizing the efficiency of their infrastructures, even in real time.

Thanks to the method and system for reproducing video contents according to the invention, the content provider and the CDN operator can deliver on broadcast networks all those contents for which that type of platform is available and advantageous.

A scenario can thus be foreseen in which those video contents with a large audience and requiring high quality are delivered through broadcast distribution platforms, including satellite platforms, whereas niche contents or contents that do not require high video quality are delivered on a normal CDN network through a broadband platform.

In this way, the video content provider will no longer be bound to a physical channel of a specific distribution platform. Users will be able to receive a video content through a particular platform among a plurality of platforms, selected depending on the type of video content offered and on the number of users interested in that content.

Conversely, as aforementioned in the description of FIG. 2, the service provider may also decide to employ a more costly platform for a low-rating program and to use a less costly platform for transmitting a different video content that draws more interest or is more profitable.

The method for processing video contents and the video receiving apparatus according to the invention are applicable, in particular, to a scenario of propagation of the DLNA standard and/or hybrid set-top boxes connected to the Internet (and/or equivalent systems). The method for processing video contents and the video receiving apparatus according to the invention are also applicable to environments with wireless hotspot coverage, wherein a suitable video receiving apparatus is introduced, e.g., a DLNA server or a set-top box with DLNA functionalities. The method for processing video contents and the video receiving apparatus according to the invention are also applicable to scenarios in which a provider of television video contents, e.g., via satellite, uses a suitable set-top box that is also connected to the Internet, through which a user can display video contents.

The man skilled in the art will easily understand that the present invention may be subject to many further variations without departing from the protection scope as set out in the appended claims.

The invention claimed is:

1. A video content receiving apparatus comprising at least one interface for interfacing to at least one associable video reproducing apparatus, and comprising:
   at least one receiver configured for receiving video contents from at least one source of contents through connections which are connected to a plurality of distribution platforms, wherein at least one first connection to a first distribution platform is of a bidirectional broadband type, and wherein at least one second connection to a second distribution platform is of a unidirectional broadcast type from said second distribution platform to said receiver, wherein said video contents are unilaterally transmitted to said at least one receiver on said second distribution platform in a transport stream compliant with the specifications of the DVB or ATSC standards, and
   wherein the at least one receiver is connected with a delivery management server that is configured to monitor the at least one first connection and the at least one second connection and determine which of the first connection and the second connection is more suitable for distributing the video contents;
   wherein said monitoring comprises verifying a band available on said first distribution platform of the broadband type and a possible presence of a transmission of a video content on said second distribution platform of the broadcast type available to said receiving apparatus;
   a first identification processor configured for identifying the video content being reproduced;
   a second identification processor configured for identifying at least one active distribution platform among said plurality of distribution platforms on which said video content is currently being transmitted by said at least one source of contents;
   a selector configured for selecting the reception of said video content being currently transmitted through said active distribution platform;
   a switch configured for switching from said first bidirectional connection to said second unidirectional connection, or vice versa, in reaction to a command received by said receiving apparatus from the delivery management server during the transmission of said video content through said active distribution platform; and
   a video processor for generating a video signal which includes said video content in a form that is reproducible by said at least one reproducing apparatus which is associable with said receiving apparatus through said at least one interface.

2. The video receiving apparatus according to claim 1, further comprising a command processor configured for receiving the command issued by the delivery management server, wherein said command processor is configured for operating on said switch according to said command.

3. The video receiving apparatus according to claim 2, wherein said first identification processor is configured for reading an identifier associated with said video content and sent to said receiving apparatus through said connections.

4. The video receiving apparatus according to claim 3, further comprising at least one signaling transmitter configured for communicating said identifier associated with said video content to said remote server.

5. The video receiving apparatus according to claim 4, wherein said at least one signaling transmitter is further configured for signaling information concerning a usage of said plurality of distribution platforms.

6. The video receiving apparatus according to claim 3, wherein said command received from said delivery management server depends on said identifier associated with said video content or on at least said information concerning a usage of said plurality of distribution platform.

7. The video receiving apparatus according to claim 1, wherein said first connection of the broadband type is adapted to connect to an Internet distribution platform, and wherein said second connection of the broadcast type is adapted to connect to at least one satellite television distribution platform.

8. A method for processing a video content, wherein a video receiving apparatus is adapted to receive video contents from at least one source of video contents through a plurality of distribution platforms, wherein said plurality of distribution platforms comprises at least one first bidirectional broadband distribution platform and at least one second unidirectional broadcast distribution platform to which said video receiving apparatus is connected, wherein said video contents are unilaterally transmitted on said second unidirectional broadcast distribution platform in a transport stream compliant with the specifications of the DVB or ATSC standards, and wherein said video receiving apparatus is operationally associable with at least one reproducing apparatus adapted to reproduce said video contents, wherein said video receiving apparatus:
   identifies a video content being reproduced;
   identifies at least one active distribution platform among said plurality of distribution platforms on which said video content is currently being transmitted by said at least one source of contents;

selects the reception of said video content by said video receiving apparatus through said active distribution platform;

receives a command sent to said video receiving apparatus for switching from said first bidirectional distribution platform during the transmission of said video content to said second unidirectional distribution platform, or vice versa from a delivery management server, wherein the deliver management server is configured to monitor the first distribution platform and the second distribution platform and determine which of the first distribution platform and the second distribution platform is more suitable for distributing the video content, wherein said monitoring comprises verifying a band available on said first distribution platform of the broadband type and a possible presence of a transmission of the video content on said second distribution platform of the broadcast type available to the video receiving apparatus; and generates an output video signal comprising said video content in a form that is reproducible by said at least one reproducing apparatus.

9. The method according to claim 8, wherein said switching between said first distribution platform and said second distribution platform, or vice versa, occurs as a consequence of a reception, by said video receiving apparatus, of the command issued by the delivery management server.

10. The method according to claim 9, wherein said video content is identified by reading an identifier associated with said video content and sent to said video receiving apparatus through at least one of said distribution platforms.

11. The method according to claim 10, wherein said video receiving apparatus further communicates said identifier associated with said video content to said remote server.

12. The method according to claim 11, wherein said video receiving apparatus further signals information concerning a usage of said plurality of distribution platforms through which said video receiving apparatus is adapted to receive video contents.

13. The method according to claim 10, wherein said command depends on at least said identifier associated with said video content or on at least information concerning a usage of said plurality of distribution platforms.

14. The method according to claim 8, wherein said first broadband distribution platform is an Internet platform, and wherein said second broadcast distribution platform is a satellite television platform.

15. A method for processing a video content in a video receiving apparatus adapted to receive video contents from at least one source of video contents through a first connection and a second connection, wherein one of the first connection and the second connection is a bidirectional broadband connection and the other of the first connection and the second connection is a unidirectional broadcast connection, wherein said video contents are unilaterally transmitted in a transport stream compliant with the specifications of the DVB or ATSC standards, and the method comprising:

identifying a video content being reproduced by a reproducing apparatus connected with the video receiving apparatus;

determining that the video content is transmitted over the first connection;

receiving the video content over the first connection;

monitoring, by a delivery management server connected to said video receiving apparatus, which of the first connection and the second connection is more suitable for distributing the video content, wherein said monitoring comprises verifying a band available on said first connection of the broadband type and a possible presence of a transmission of the video content on said second connection of the broadcast type available to the video receiving apparatus;

receiving a command signal from said delivery management server to switch from the first connection to the second connection, or vice versa, after determining that the second connection is more suitable for distributing the video content than the first connection, or vice versa, wherein the command signal is received from a provider of the video contents during the transmission of said video content;

switching from said first bidirectional connection to said second unidirectional connection, or vice versa, without any input from a user during the transmission of said video content through said active distribution platform in reaction to said command signal; and generating an output video signal that includes the video content in a form that can be reproduced by the reproducing apparatus.

* * * * *